(12) United States Patent
Yamamoto et al.

(10) Patent No.: US 7,671,505 B2
(45) Date of Patent: Mar. 2, 2010

(54) BRUSH HOLDER IN ELECTRIC MOTOR

(75) Inventors: Tsutomu Yamamoto, Yuki (JP); Jun Kondo, Maebashi (JP)

(73) Assignee: Mitsuba Corporation, Kiryu-shi (JP)

( * ) Notice: Subject to any disclaimer, the term of this patent is extended or adjusted under 35 U.S.C. 154(b) by 135 days.

(21) Appl. No.: 11/919,577

(22) PCT Filed: Apr. 28, 2006

(86) PCT No.: PCT/JP2006/308945
§ 371 (c)(1),
(2), (4) Date: Oct. 30, 2007

(87) PCT Pub. No.: WO2006/120934
PCT Pub. Date: Nov. 16, 2006

(65) Prior Publication Data
US 2009/0058220 A1 Mar. 5, 2009

(30) Foreign Application Priority Data

| May 2, 2005 | (JP) | ............................. 2005-134218 |
| May 2, 2005 | (JP) | ............................. 2005-134219 |

(51) Int. Cl.
*H02R 39/38* (2006.01)
(52) U.S. Cl. ................................................... 310/239
(58) Field of Classification Search ......... 310/239–242, 310/112, 89
See application file for complete search history.

(56) References Cited

U.S. PATENT DOCUMENTS

| 6,242,824 B1* | 6/2001 | Torii et al. ..................... 310/42 |
| 6,459,188 B1* | 10/2002 | Lombardo et al. .......... 310/239 |
| 2004/0201296 A1* | 10/2004 | Hama et al. ................... 310/71 |
| 2006/0103259 A1* | 5/2006 | Vacheron ..................... 310/239 |

FOREIGN PATENT DOCUMENTS

| JP | Y2 7-29718 | 7/1995 |
| JP | A 2001-112209 | 4/2001 |

* cited by examiner

*Primary Examiner*—Quyen Leung
*Assistant Examiner*—Leda Pham
(74) *Attorney, Agent, or Firm*—Oliff & Berridge, PLC

(57) ABSTRACT

An electric motor includes a cylindrical yoke with a bottom; a bracket that covers an opening of the yoke; and a brush holder. The brush holder includes a brush housing portion, with the brush housing portion having three side piece portions, excluding a bottom piece portion, integrally formed; a first disk portion; and a second disk portion. The first disk portion and the second disk portion are integrated with the bottom piece portion of the brush housing portion. A ring-shaped abutting surface and the bottom piece portion of the brush housing portion are formed on a bracket-side disk surface of the brush holder. The abutting surface is formed as a holding portion that is pressed to the yoke by the bracket via a bracket-side elastic member.

13 Claims, 7 Drawing Sheets

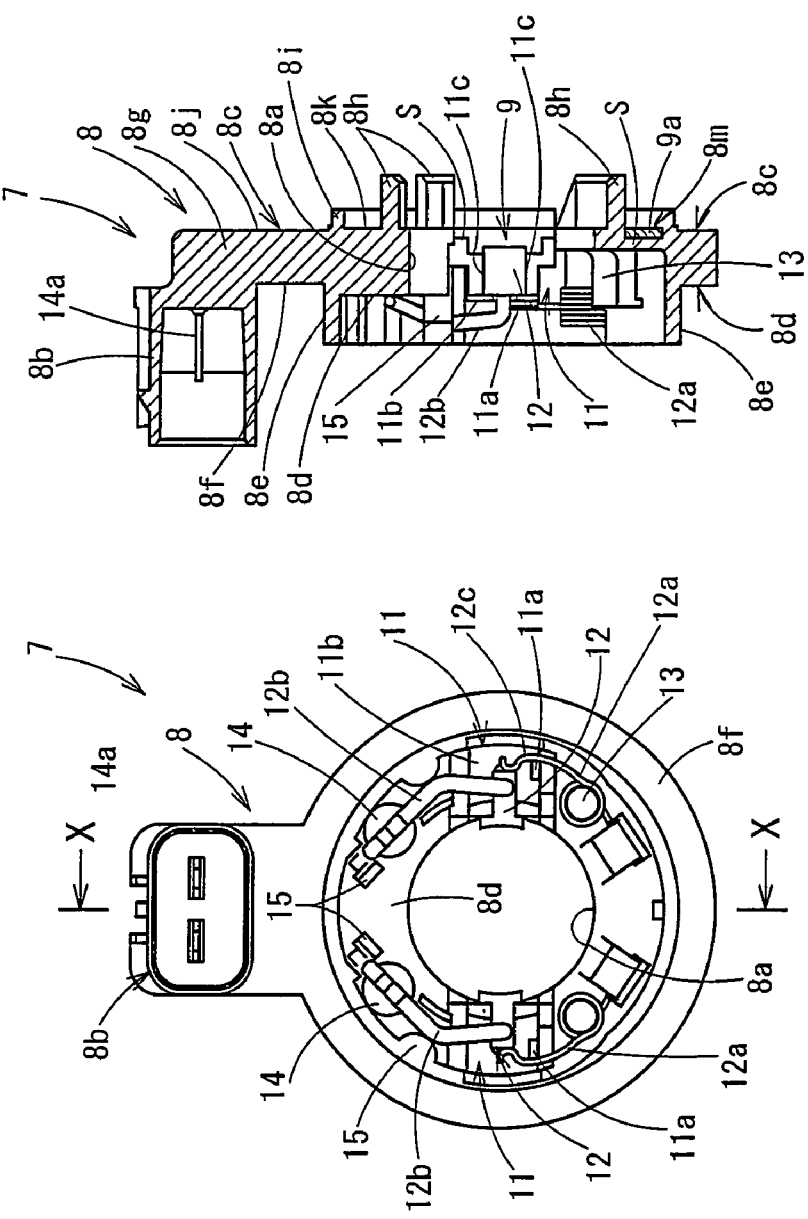

BRUSH HOLDER IN ELECTRIC MOTOR

This application is the U.S. National Stage of PCT/JP2006/308945, filed Apr. 28, 2006, which claims priority from JP2005-134218 and JP2005-134219, both of which were filed May 2, 2005, the entire disclosures of which are incorporated herein by reference hereto.

BACKGROUND

The present disclosure relates to a brush holder.

Generally, there exists electric motors that hold, in a sandwiched manner between a cylindrical yoke with a bottom and a bracket that covers an opening of the yoke, a brush holder with a disk portion on which a brush housing portion is formed. For these electric motors, it is necessary to prevent the brush holder from rotating with respect to the yoke and the bracket, or from being displaced. In order to prevent the brush holder from rotating or from being displaced, the brush holder, yoke and bracket are integrated together using screws, for example, or similar structure. Such a construction, however, has disadvantages. Not only is it troublesome and complicated integrating the brush holder, yoke and bracket using screws, but also the number of operation processes and components is also increased.

In order to overcome those disadvantages, a proposed method of integration is to integrate the brush holder, yoke, and bracket without using screws. For example, a plurality of convex portions are formed that protrude in the outward radial direction from the outer circumference of a disk portion of the brush holder in the circumferential direction. Then, a tubular elastic member is attached to those respective convex portions. After that, the convex portions with the tubular members are fitted with concave fitting portions that are formed on any one of a yoke and a housing (corresponding to a bracket of the present disclosure) so as to be supported (see Japanese Published Unexamined Patent Application No. 2001-112209, for example).

SUMMARY

However, in the conventional art as described above, concave portions to be fitted with the convex portions must be formed on the outer circumference of the yoke or housing, and, therefore, the outside diameter of the yoke or housing is increased. This is disadvantageous as it goes against a reduction in weight and size. A tubular elastic member must be externally fitted and mounted to each of the convex portions that are formed in the circumferential direction. This is another disadvantage because the operation is troublesome and productivity is inferior. The present disclosure discusses how these problems are solved, and solves other problems, and is also able to achieve various advantages.

The disclosure addresses an exemplary aspect of an electric motor that includes a cylindrical yoke with a bottom; a bracket that covers an opening of the yoke; and a brush holder. The brush holder includes a brush housing portion, with the brush housing portion having three side piece portions, excluding a bottom piece portion, integrally formed; a first disk portion; and a second disk portion. The first disk portion and the second disk portion are integrated with the bottom piece portion of the brush housing portion. A ring-shaped abutting surface and the bottom piece portion of the brush housing portion are formed on a bracket-side disk surface of the brush holder. The abutting surface is formed as a holding portion that is pressed to the yoke by the bracket via a bracket-side elastic member.

In another exemplary aspect, the bracket-side elastic member is formed in a flat ring shape.

In another exemplary aspect, a rib is provided on the bracket-side elastic member in a protruding condition so as to make contact with the abutting surface.

In another exemplary aspect, a ring-shaped projection that protrudes to a bracket side is formed at an outer radial side of the abutting surface. A ring-shaped first concave portion, in which the projection is inserted, is formed on a brush holder-side side surface of the bracket. The bracket-side elastic member includes an inner radial-side piece portion that is interposed in the abutting surface; an outer radial-side piece portion that is interposed between a front end face of the projection and a groove bottom of the first concave portion; and a coupling piece portion that couples the inner radial side and outer radial-side piece portions and is interposed between an inner circumferential surface of the first concave portion and an inner circumferential surface of the projection.

In another exemplary aspect, a guide piece is formed on the brush holder and protrudes to a bracket side so as to be located at an inner radial side of the abutting surface. On the bracket, formed is a ring-shaped second concave portion in which the guide piece is inserted to position each other.

In another exemplary aspect, the brush holder and an end portion of the yoke opening hold a flat-plate ring-shaped yoke-side elastic member in an interposing manner.

In another exemplary aspect, the bracket-side elastic member is constructed with an outside diameter that is smaller than that of a yoke-side elastic member.

According to various exemplary aspects of the disclosure, since the holding portion of the brush holder by the bracket is located at the inner radial side, a reduction in size can be realized.

According to various exemplary aspects of the disclosure, the brush holder can be reliably fixed and held on the bracket without using a special fixing means such as screwing.

According to various exemplary aspects of the disclosure, not only can sealing ability be enhanced, but also the brush holder can be held in a stable condition.

According to various exemplary aspects of the disclosure, a sealing state between the brush holder and bracket can be enhanced, and the brush holder can be firmly fixed and held on the bracket so that the brush holder can be further firmly held. Moreover, while fitting quality can be improved, the individual functions of the respective inner and outer radial-side piece portions can be prevented from being impaired, too.

According to various exemplary aspects of the disclosure, positioning in the radial direction for incorporation of the brush holder and the bracket can be easily performed.

According to various exemplary aspects of the disclosure, not only can sealing condition between the yoke and bracket be enhanced, but also the brush holder can be reliably fixed and held on the yoke without using a special fixing means such as screwing.

According to various exemplary aspects of the disclosure, because the yoke and the bracket are not necessarily formed in special shapes, flexibility in designing can be realized, and thus downsizing can be achieved.

BRIEF DESCRIPTION OF THE DRAWINGS

Various embodiments of the disclosure will be described with reference to the drawings, wherein:

FIG. 4A is a left side view of a brush holder, FIG. 4B is a sectional view along X-X in FIG. 4A, and FIG. 4C is a main-part enlarged view of FIG. 4B;

DETAILED DESCRIPTION OF EMBODIMENTS

Figure 1:
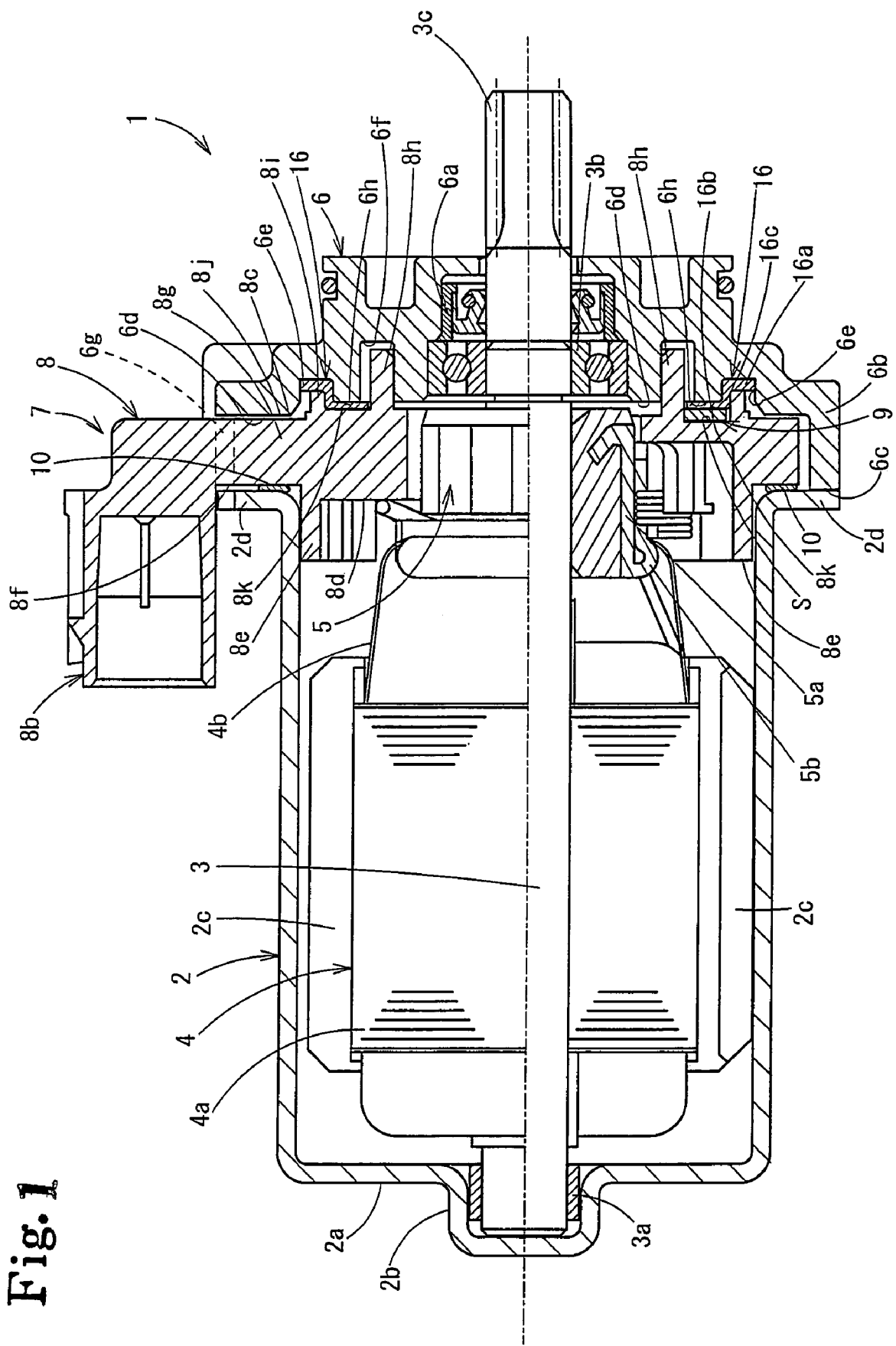
FIG. 1 is a partially sectional front view of an electric motor.
Figure 2A:
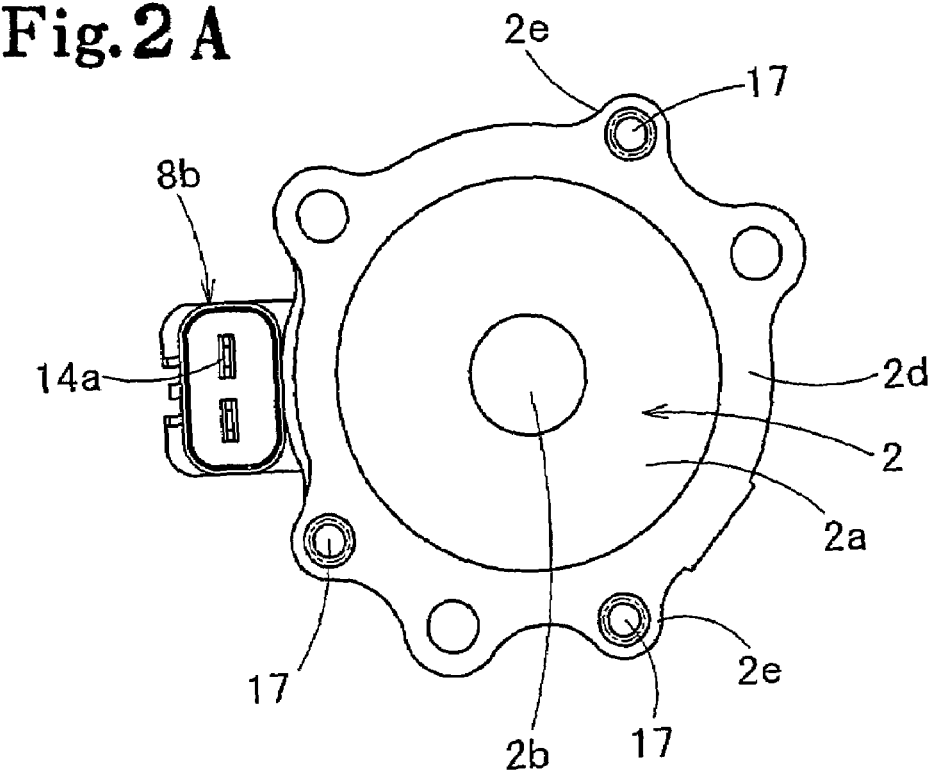
FIG. 2A is a left side view.
Figure 2B:
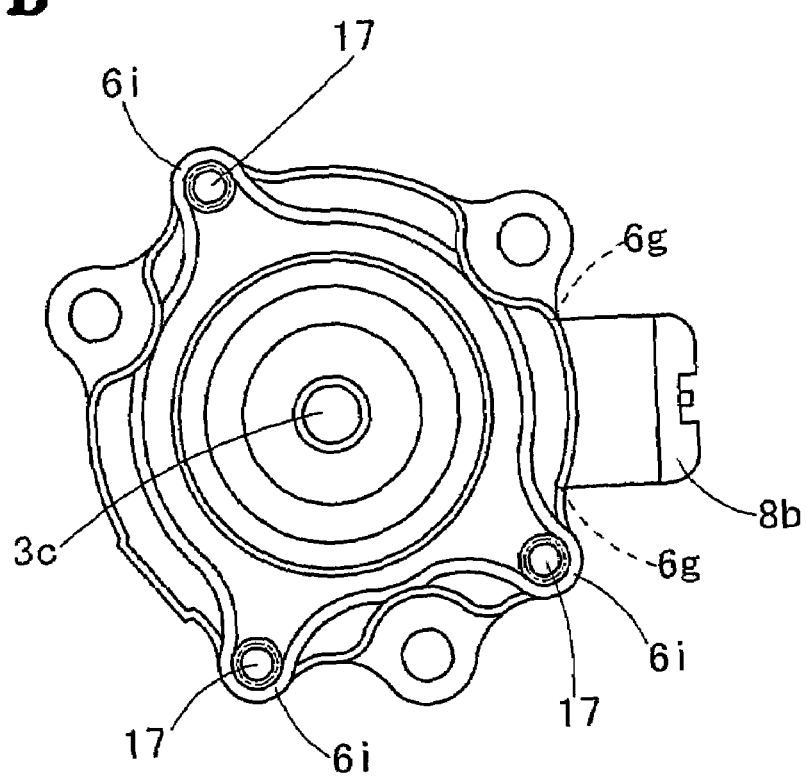
FIG. 2B is a right side view of FIG. 1.

Next, embodiments of the present disclosure will be described based on the drawings. In FIG. 1, reference numeral 1 denotes an electric motor that is a component of electric equipment to be mounted on a vehicle. On a cylinder bottom portion 2a of a yoke 2, which has a cylindrical shape with a bottom and is a component of the electric motor 1, formed is a shaft receiving portion 2b. On the shaft receiving portion 2b, supported is a base end portion of a motor shaft 3 so as to be freely rotatable via a bearing 3a.

To the motor shaft 3, integrally and externally fitted is a core 4 that is formed by laminating a plurality of core materials 4a (see FIG. 1). A plurality of coils 4b are wound around the core 4. To the motor shaft 3, further integrally externally fitted is a commutator 5 located at a front end side of the core 4. End portions of the plurality of coils 4b are hung around risers 5b of a plurality of commutator segments 5a that are provided in the circumferential direction on an outer circumferential surface of the commutator 5 so that the risers 5b are electrically connected with the commutator segments 5a.

In a freely rotatable, penetrating manner via a bearing 3b, a front end portion of the motor shaft 3 is supported through a shaft supporting portion 6a that has a through-hole portion 6a and is formed on a bracket 6 that is disposed so as to cover an opening end portion of the yoke 2 (see FIG. 1). And a penetrating front end portion 3c of the motor shaft 3 is interlocked and coupled with an actuator (not illustrated), as is often conventionally done.

For the yoke 2, a pair of permanent magnets 2c are immovably attached to a cylinder inner circumferential surface so that a pair of magnetic poles are formed in the circumferential direction (see FIG. 1). At the cylinder opening end portion of the yoke 2, integrally formed is a flange portion 2d that forms a striking surface extended to the outer radial side and protruded in the radial direction. The flange portion 2d is constructed at a yoke-side holding portion that holds a brush holder 7, which will be described later.

The bracket 6 is constructed such that the shaft supporting portion 6a that supports the motor shaft 3 in a penetrating manner is formed at the center portion of a disk-shaped body by use of an aluminum mold material (see FIG. 1). On an outer circumferential portion of the bracket 6, formed is a projection piece portion 6b that is protruded to the yoke 2 side. A protruded end face 6c of the projection piece portion 6b serves as a striking surface that is struck against the flange portion 2d.

Figure 3B:
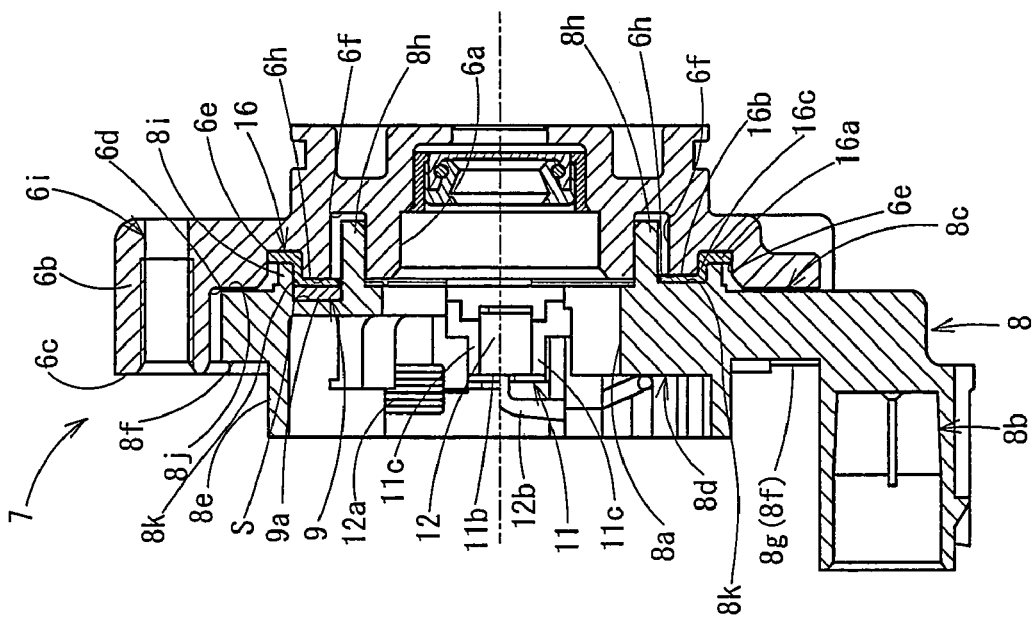
FIG. 3B is a bracket and a sectional view along X-X in FIG. 3A.

Furthermore, on a disk surface 6d of the bracket 6 that is facing the yoke 2 side and is located between the shaft supporting portion 6a and the projection piece portion 6b, formed side by side in the radial direction are two first concave portions 6e and two second concave portions 6f in ring shapes (see FIGS. 1 and 3B). The first concave portions 6e are located at the outer radial side and are formed in a shallower groove shape. The second concave portions 6f are located at the inner radial side and formed in a deeper groove shape.

Between the yoke 2 and bracket 6, supported is a brush holder 7 that is located at an axial position corresponding to the part of the motor shaft 3 that is externally fitted with the commutator 5 (see FIG. 1). While the brush holder 7 is formed of a disk-shaped body with a predetermined plate thickness, the brush holder 7 of the present embodiment is constructed by integrally incorporating a second disk portion 9 in a first disk portion 8 (see FIGS. 1 and 3B).

Both the first disk portion 8 and the second disk portions 9 are formed by integral molding with a resin material. The first disk portion 8 is formed of a disk-shaped body with a predetermined plate thickness. A through-hole 8a to be loosely fitted with the commutator 5 is opened at the center of the first disk portion 8 (see FIGS. 3A, 4A and 4B, and 5A). At the outer circumference of the first disk portion 8, formed is a coupler portion 8b that is protruded in the outward radial direction (see FIGS. 1, 2A and 2B, 3B, 4A and 4B, and 5A and 5B). For the coupler portion 8b, formed is a connecting portion that is facing in the axial direction of the motor shaft 3, and the coupler portion 8b is formed so as to extend along the outer circumference of the yoke 2 beyond the yoke flange portion 2d (see FIG. 1). In addition, the first disk portion 8 is constructed so that one of the pair of disk surfaces, (hereinafter, bracket-side disk surface) 8c faces the bracket 6 and the other disk surface (hereinafter, yoke-side disk surface) 8d faces the yoke 2 (see FIG. 1).

On the yoke-side disk surface 8d, integrally formed is a ring-shaped first guide piece 8e that is protruded to the yoke 2 side. Positioning of the brush holder 7 and yoke 2 in the radial direction can be performed by internally fitting (inserting) the first guide piece 8e into the cylinder at the opening end side of the yoke 2. In the internally fitted condition, an outer radial-side surface 8f of the yoke-side disk surface 8d, at the outer radial side, is opposed (struck) against the yoke flange portion 2d. A yoke-side elastic member 10 is interposed between the outer radial-side surface 8f and flange portion 2d. Meanwhile, the yoke-side elastic member 10 is a rubber elastic material that is integrally formed in a flat ring shape.

The coupler portion 8b of the brush holder 7 is constructed by being formed in a manner protruded to the outer radial side so as to be located at a part along the outer circumference of the yoke 2 beyond the flange portion 2d. A coupling portion 8g that couples the coupler portion 8b and yoke-side disk surface 8d is formed continuously from the outer radial-side surface 8f and is struck against the flange portion 2d. The outer radial-side surface 8f and coupling portion 8g serve as a ring-shaped holding portion on the brush holder 7 side that is held by the yoke 2.

Furthermore, on the yoke-side disk surface 8d of the first disk portion 8, integrally formed are necessary members. A pair of brush housing portions 11 are in a state opposing in the radial direction. A pair of holding poles 13 hold coil springs 12a that are to press brushes 12 that are housed in the brush housing portions 11 to the inner radial side respectively so as to slidably contact with the commutator segments 5a of the commutator 5. A plurality of guides 15 are to guide pigtails 12b that are respectively connected to the brushes 12 to the side of a pair of terminal plates 14 that are molded on the first disk portion 8. The respective terminal plates 14 have electrical continuity with a pair of terminal plates 14a that are molded on the coupler portion 8b. With the coupler portion 8b being connected with an external coupler and having electrical continuity with an external power, the power is fed to the pigtails 12b, brushes 12, and commutator segments 5a via the terminal plates 14a and 14, and then the coils 4b are excited.

Figure 3A:
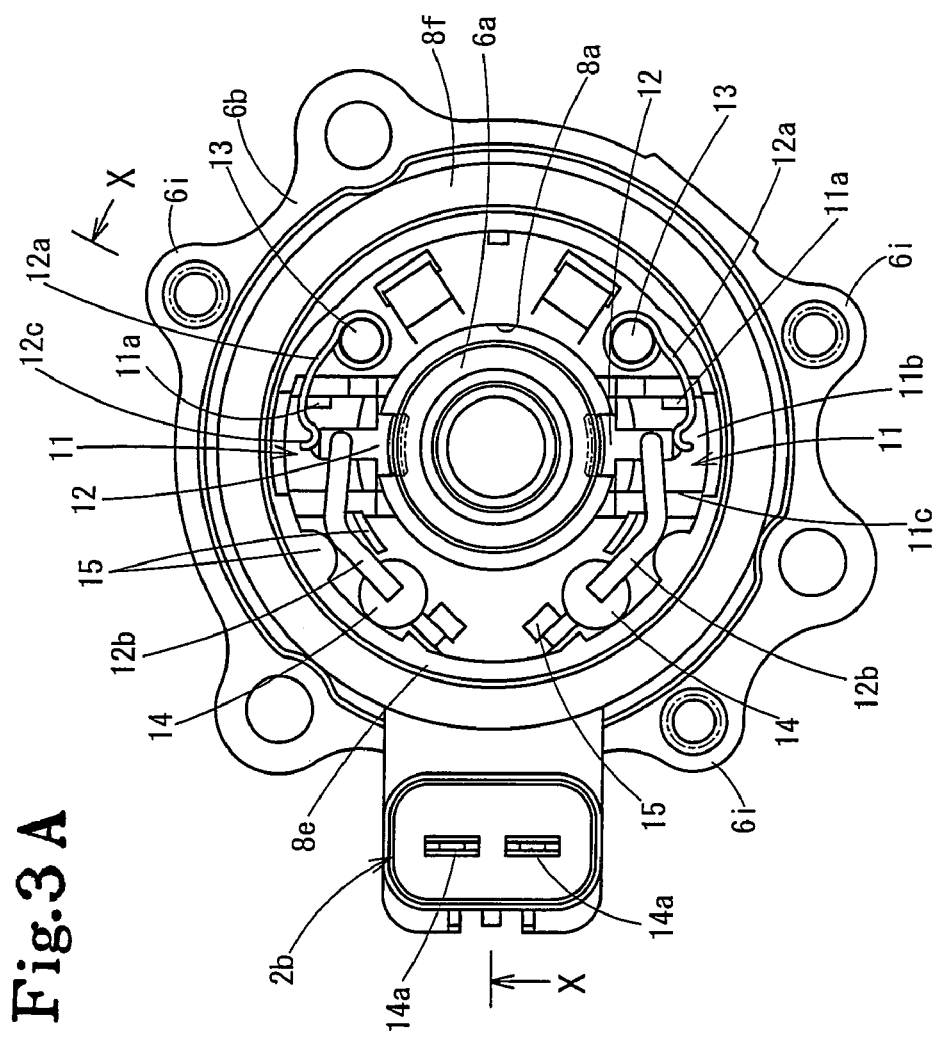
FIG. 3A is a left side view in an incorporated condition of a brush holder.

In FIGS. 3A and 3B, for the coil spring 12a, a pressing piece 12c that presses the brush 12 is latched with a holding claw 11a (provided on an upper piece portion 11b to be described later) that is provided on the brush housing portion 11. Here, the brush 12 is being provisionally held so as not to be urged by the coil spring 12a. And in a condition that the motor shaft 3 is incorporated in the brush holder 7, it is set that the coil spring 12a releases the pressing piece 12c from the holding claw 11a so that the pressing piece 12c abuts against the outer radial side end face of the brush 12 and that the brush 12 is urged to be pushed away to the inner radial side (broken lines as shown in FIG. 3A).

The first disk portion 8 is, as described above, formed by integral molding a resin material. On the outer radial side thereof, formed is the first guide piece 8e that is protruded to the yoke 2 side. When the brush housing portion 11 is formed on the first disk portion 8, it is necessary for the brush housing portion 11 to be formed with four side surfaces that enclose to hold four side surfaces of the brush 12. For molding the brush housing portion 11 in such a shape, a space to extract a mold material is required at the radial center side of the first disk portion 8.

Since the first disk portion 8 of the present embodiment has been reduced in diameter, however, no such space as to extract a mold material toward the inner radial side can be secured. In addition, it is impossible to mold all four side surfaces of the brush housing portion 11 on the first disk portion 8 at one time. Consequently, for the brush housing portion 11 to be formed on the first disk portion 8 side, only three side piece portions are formed by one molding: a side surface (upper piece portion) 11b to be on the axial yoke 2 side and a pair of side piece portions 11c opposed in the circumferential direction. No side piece portion (bottom piece portion) on the axial bracket side 6 is formed on the first disk portion 8, and the part provided has an opening H (see FIG. 5A).

On the bracket-side disk surface 8c of the first disk portion 8, formed in a protruded manner to the bracket 6 side is a second guide piece 8h (corresponding to a guide piece of the present disclosure) that is located in the vicinity of the outer radial side of the through-hole 8a (see FIG. 4B).

Figure 5:
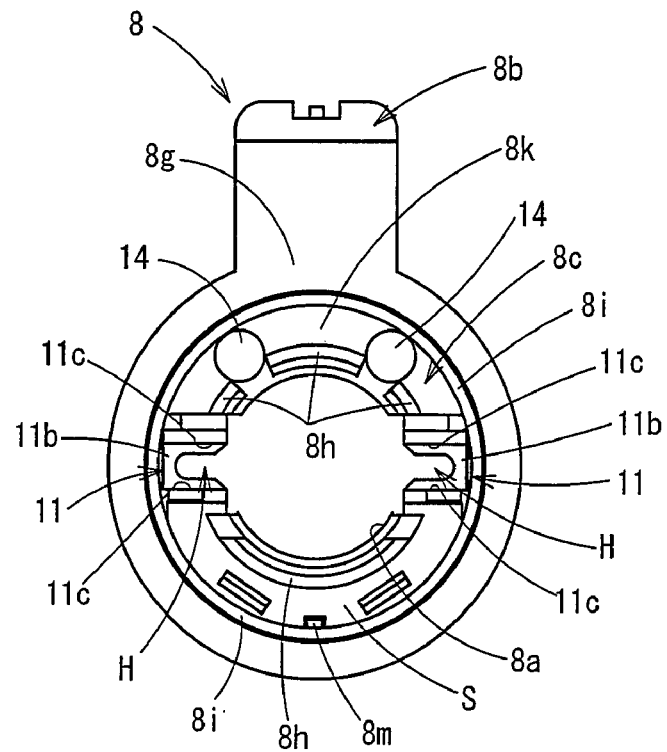
FIG. 5A is a right side view of a first disk portion.
FIG. 5B is a right side view of a brush holder.
Figure 5:
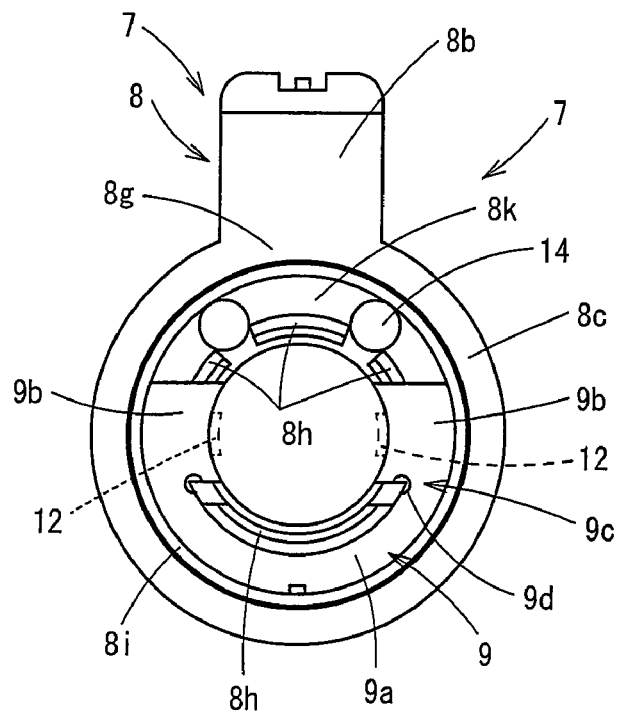
Figure 6:
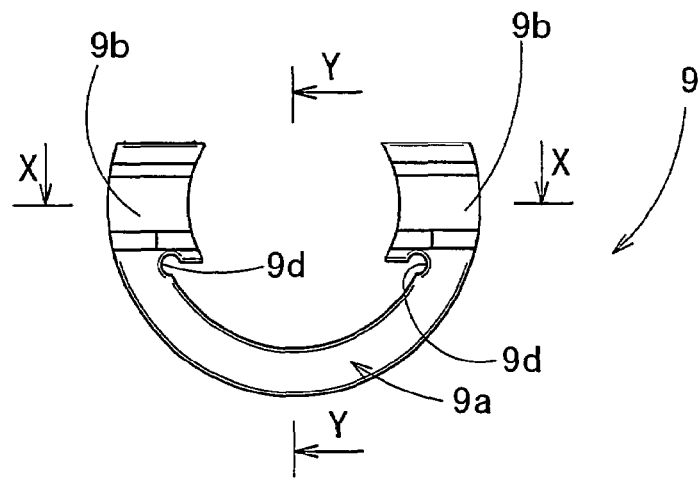
FIG. 6A is a left side view of a second disk portion.
FIG. 6B is a sectional view along X-X in FIG. 6A.
FIG. 6C is a sectional view along Y-Y in FIG. 6A.
FIG. 6D is a right side view.
Figure 6:
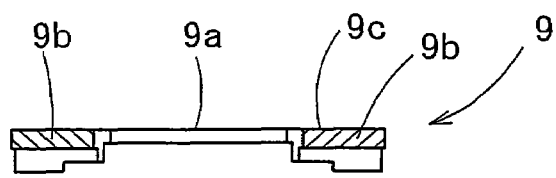
Figure 6:
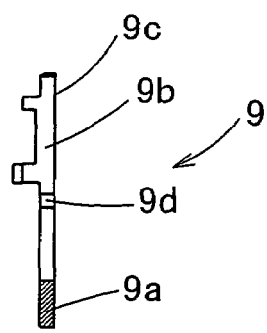
Figure 6:
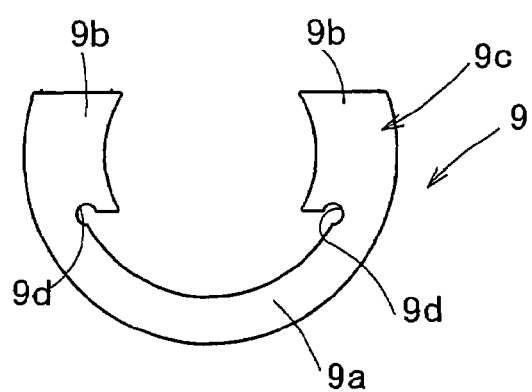

For the second guide piece 8h, a ring-shaped projection piece is partially cut (see FIG. 5A). The second guide piece 8h extends across almost the entire area of a lower part on the side opposite to the (upper) part in which the coupler portion 8b is formed and from the part in which brush housing portion 11 is formed. The second guide piece 8h also extends on the upper side from the part in which the brush housing portion 11 is formed. The upper second guide piece 8h is cut at the part of disposition of the terminal plate 14.

Furthermore, on the bracket-side disk surface 8c, integrally formed is a ring-shaped projection 8i that is located at the outer radial side of the second guide piece 8h and protruded to the bracket 6 side (see FIGS. 1, 3B, 4B, and 5A). The amount of protrusion of the projection 8i is set to be smaller than that of the protrusion of the second guide piece 8h.

In addition, on the bracket-side disk surface 8c of the first disk portion 8, in the lower part including the part in which the brush housing portion 11 is formed, a surface position in the motor shaft 3 direction between the second guide piece 8h and projection 8i is provided as a step surface S that is retracted to the yoke 2 side that is further than the surface position between the second guide piece 8h and projection 8i in the upper half part.

The second disk portion 9 is incorporated as being struck against the lower step surface S. In fact, the second disk portion 9 is provided with a plate portion 9a (see FIGS. 6A-6D) that is a flat plate-like semi-ring shaped plate body to be applied to the step surface S of the first disk portion 8 (see FIGS. 4C and 5B). At each of both end portions of the plate portion 9a, formed is a bottom piece forming portion (bottom piece portion) 9b that covers the opening H of the brush housing portion 11 integrally formed on the first disk portion 8 and that forms a bottom piece portion of the brush housing portion 11.

Further, for the second disk portion 9, a bracket-side disk surface 9c is formed as being flush at both parts of the plate portion 9a and bottom piece portion forming portion 9b. The bracket-side disk surface 9c is also set to be flush with the bracket-side disk surface 8c of the upper side of the first disk portion 8 in a condition where the second disk portion 9 is incorporated in the first disk portion 8. Thereby, on the bracket 6 side of the brush holder 7, formed is a flush and ring-shaped abutting surface 8k that is located between the second guide piece 8h and projection 8i, that is, on the inner radial side of the projection 8i and at the part where the brush housing portion 11 is formed. The abutting surface 8k is set to serve as a holding portion on the brush holder 7 side that is held by the bracket 6. And the abutting surface 8k is formed as being located at the inner radial side further than the outer radial-side surface 8f that serves as a holding portion held by the yoke 2.

Next, incorporation of the second disk portion 9 into the first disk portion 8 will be described. The second disk portion 9 is incorporated from the bracket 6 side of the first disk portion 8. On the projection 8i of the first disk portion 8, formed is a latching claw 8m that is located at an inner circumferential surface part of the lower position and is protruded to the inner radial side (see FIGS. 4C and 5A). The second disk portion 9 is set by engaging circumferential both end portions of the lower second guide piece 8h with corner portions 9d that is cut in arc shapes and is formed between the plate portion 9a and bottom piece portion forming portion 9b, respectively (see FIG. 5B). The second disk portion 9 is also set by pushing the plate portion 9a forward with a lower end portion of the plate portion 9a struck against the latching claw 8m as being positioning fulcrums so that the plate portion 9a is integrally incorporated in a state where the lower end portion of the plate portion 9a climbs over the latching claw 8m and abuts against the step surface S of the first disk portion 8.

The lower second guide piece 8h is formed such that circumferential both end portions are cut in a sloping manner and the second guide piece 8b has a shorter circumferential length closer toward the protruded end side. Accordingly, with the corner portions 9d of the second disk portion 9 being engaged with the circumferential both end portions of the second guide piece 8h at the protruded end side of the second guide piece 8h, and with the second disk portion 9 being pushed in as it is, an integrating operation of these disk portions 8 and 9 can be easily performed.

The brush holder 7 and bracket 6 are set to be positioned in the circumferential direction by inserting the coupler portion 8b that is formed on the first disk portion 8 of the brush holder 7 into a coupler supporting portion 6g that is formed by cutting away the projection piece portion 6b of the bracket 6. The brush holder 7 and bracket 6 are also set to be positioned in the radial direction by fitting the projection 8i with the first concave portion 6e of the bracket 6 and butting the second guide piece 8h in a fitting state with the second concave portion 6f of the bracket 6.

In this incorporating state above, of the bracket-side disk surface 8c of the brush holder 7, an outer circumferential side surface 8j that is located at the outer radial side of the projection 8i is opposed to the disk surface 6d at the inner radial side that is further than the projection piece portion 6b. The abutting surface 8k that is a holding portion and is located at the inner radial side of the projection 8i is opposed to an inner radial side disk surface 6h that is formed between the first and second concave portions 6e and 6f. And the inner radial side disk surface 6h is set at a bracket-side holding portion that is to hold the brush holder 7.

Figure 7A:
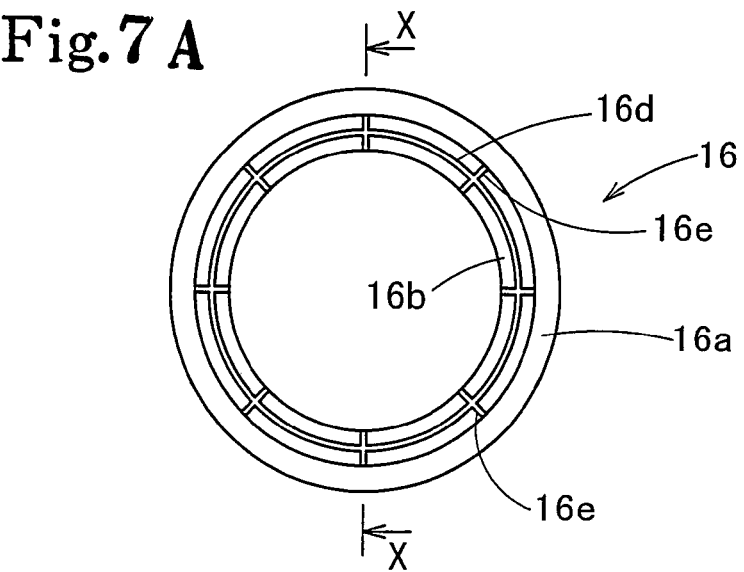
FIG. 7A is a left side view of a bracket-side elastic member.
Figure 7B:
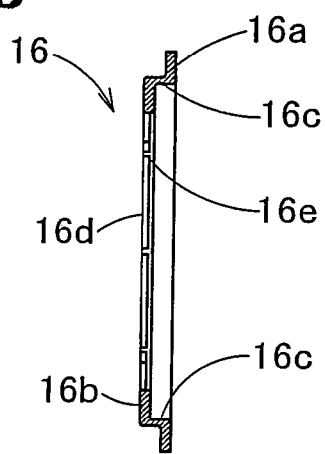
FIG. 7B is a sectional view along X-X in FIG. 7A.
Figure 7C:
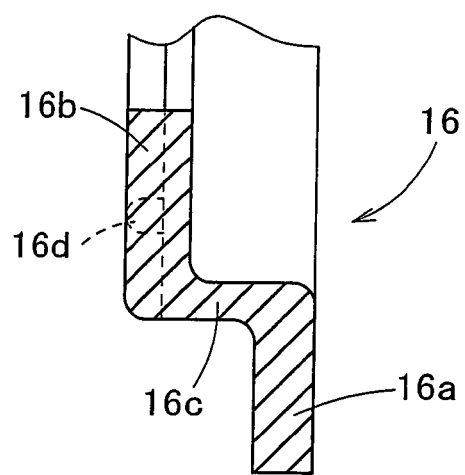
FIG. 7C is a main-part enlarged view of FIG. 7B.

Furthermore, a bracket-side elastic member 16, formed by integral molding with a rubber elastic material, is interposed between the brush holder 7 and bracket 6 (see FIG. 3B). The bracket-side elastic member 16 is also provided with a flat-plate ring-shaped outer radial-side piece portion 16a that is located at the outer radial side and a flat-plate ring-shaped inner radial-side piece portion 16b that is located at the inner radial side. The outer radial-side piece portion 16a is interposed between the front end face of the projection 8i and groove bottom surface of the first concave portion 6e. The inner radial-side piece portion 16b that corresponds to an elastic member of the present disclosure (see FIGS. 7A-7C) is set to be interposed between the abutting surface 8k that is formed by the first and second disk portions 8 and 9 into a holding portion and the inner radial side disk surface 6h that is formed between the first and second concave portions 6e and 6f (see FIGS. 1 and 3B).

For the bracket-side elastic member 16, a coupling piece portion 16c is located as a coupler between the outer radial-side piece portion 16a and inner radial-side piece portion 16b and is formed in a cylindrical shape. The outer radial-side piece portion 16a and inner radial-side piece portion 16b are thereby integrally formed (see FIG. 7C). This coupling piece 16c is formed to be thinner than the outer radial-side piece portion 16a to be, and is also set to be disposed between the inside inner circumferential surface of the projection 8i and the inside inner circumferential surface of the first concave portion 6e along these inside inner circumferential surfaces.

Accordingly, the electric motor 1 is constructed such that the motor shaft 3 is passed through the brush holder 7 that is positioned and incorporated in the bracket 6 and that these are incorporated into the yoke 2. In this case, therefore, positioning in the circumferential direction has been performed by aligning a plurality of immovably attaching portions 2e that is formed in the circumferential direction of the flange portion 2d of the yoke 2 with a plurality of immovably attaching portions 6i that is formed in the circumferential direction of the projection piece portion 6b of the outer circumference of the bracket 6. Positioning in the radial direction, too, has been performed by internally fitting (inserting) the ring-shaped first guide piece 8e of the brush holder 7 that is protruded to the yoke 2 side into the cylinder at the opening end side of the yoke 2. In this course of the incorporation, the yoke-side elastic member 10 is interposed between the outer radial-side surface 8f and the yoke flange portion 2d, as described earlier.

In the structure incorporated as such, by screwing a screw 17 that is inserted from the yoke-side immovably attaching portion 2e side therethrough with a screw groove of the bracket-side immovably attaching portion 6i, the yoke-side and bracket-side elastic members 10 and 16 become pressed respectively, and are integrated with the yoke, brush holder 7, and bracket 6. Between the yoke 2 and brush holder 7, via the yoke-side elastic member 10, the yoke 2 elastically urges and presses the outer radial-side surface 8f to the bracket 6 side. Between the brush holder 7 and bracket 6, the bracket 6 elastically urges and presses the abutting surface 8k to the yoke 2 side via the bracket-side elastic member inner radial-side piece portion 16b that is disposed between the abutting surface 8k that is located at the inner radial side of the projection 8i and inner radial-side disk surface 6h. And thereby the brush holder 7, for which the outer radial-side surface 8f and abutting surface 8k are sandwiched in an elastically urging manner between the yoke 2 and bracket 6, is fixed and held so as not to rotate.

Furthermore, on the inner radial-side piece portion 16b of the bracket-side elastic member 16, integrally formed in the circumferential direction on a surface facing the brush holder 7 side are a ring-shaped first rib 16d and a plurality of second ribs 16e facing in the radiation direction so as to be orthogonal to the first rib 16d. A line contact state is thus produced at an abutting surface between the abutting surface 8k on the brush holder 7 side and bracket-side elastic member inner radial-side piece portion 16b. This reduces a repulsive force of the inner radial-side piece portion 16b derived from elastic deformation of the inner radial-side piece portion 16b, so the brush holder 7 can be elastically urged in a well-balanced manner.

In addition, between the brush holder 7 and bracket 6, the front end face of the projection 8i and the groove bottom surface of the first concave portion 6e are in surface contact in an elastically urged manner via the outer radial-side piece portion 16a of the bracket-side elastic member 16. And the brush holder 7 and bracket 6 thereby can be fixed and held as being reliably sealed therebetween.

At this time, since the coupling piece portion 16c that couples the bracket-side elastic member 16 on the bracket 6 side has been formed thin, an elastic deformation does not affect the inner radial-side piece portion 16b when a load is applied to the outer radial-side piece portion 16a and causes a great elastic deformation. Consequently, although the bracket-side elastic member 16 simplifies incorporation as one member, when the outer radial-side piece portion 16a and inner radial-side piece portion 16b are individually elastically deformed to perform their respective sealing and fixing/holding functions, it is possible to reliably perform these functions without impairing the functions with respect to each other.

In the present embodiment constructed as described, the brush holder 7 that is a component of the electric motor 1 is held between the yoke 2 and bracket 6 in a sandwiched manner without using fixing means such as screwing. Moreover, in this case, the yoke 2 and bracket 6 are interposed with the flat-plate ring-shaped yoke-side elastic member 10 and bracket-side elastic member 16 that has predetermined lengths in the radial direction, respectively, with respect to the brush holder 7. Via these elastic members 16 and 10, the ring-shaped outer radial-side surface 8f to be a holding portion of the brush holder 7 are pressed by a force component from the yoke 2 side to the bracket 6 side, while the ring-shaped abutting surface 8k are pressed by a force component from the bracket 6 side to the yoke 2 side. The brush holder 7 is thus sandwiched between these in an elastically urged manner and can be reliably fixed and held so as not to rotate. As a result, it is unnecessary to employ special shapes as in the conventional art where convex portions protruded to the outer radial side are provided on the outer circumference of a brush holder, while convex portion fitting parts are formed on a yoke or a housing. It is also unnecessary to increase the outside diameter of the yoke 2 or bracket 6; thus, a reduction in size can be realized.

Between the bracket 6 and brush holder 7, against the abutting surface 8k serving as the part of formation of the brush housing portion 11 of the brush holder 7, the outside diameter of the bracket 6 can be reduced as much as possible because the inner radial side disk surface 6h is elastically urged to the yoke 2 side via the inner radial-side piece portion 16b of the bracket-side elastic member 16 for holding.

Moreover, the brush holder 7 is constructed such that the first disk portion 8 that is formed from the three side pieces 11b and 11c of the brush housing portion 11 excluding the bottom side portion are integrated with the second disk portion 9 that is provided with the bottom piece forming portion 9b that covers the opening H of the brush housing portion 11. Located at the part where the brush housing portion 11 is formed, the abutting surface 8k is formed against which the inner radial-side piece portion 16b of the bracket-side elastic member 16 is struck. And the abutting surface 8k being as a holding portion of the brush holder 7, the bracket-side elastic member 16 is intermediately provided with respect to the inner radial side disk surface 6g of the bracket 6. As a result, it is not necessary to increase the bracket 6 in diameter in order to secure and form a part for fixing and holding the brush holder 7. The first disk portion 8 can be formed with a small diameter. Since the opening H that is formed on the brush housing portion 11 is covered by the bottom piece forming portion 9b of the second disk portion 9, the bottom surface of the brush 12 is never exposed from the brush holder 7. Therefore, insulation in the brush housing portion 11 is excellent.

On the inner radial-side piece portion 16b of the bracket-side elastic member 16, the ring-shaped first rib 16d that is protruded to the brush holder 7 (abutting surface 8k) side and the plurality of radial second ribs 16e are formed. Then, the inner radial-side piece portion 16b makes line contact with the abutting surface 8k. Accordingly, even when an excessive load is applied to the inner radial-side piece portion 16b, the brush holder 7 never floats up from the bracket 6 because of a repulsive force based on elastic deformation of the inner radial-side piece portion 16b. The stress on the inner radial-side piece portion 16b can be balanced; therefore, stable holding of the brush holder 7 can be realized.

Between the brush holder 7 and bracket 6, the ring-shaped projection 8i is formed on the brush holder 7 side. The outer radial-side piece portion 16a of the bracket-side elastic member 16 is interposed between the front end face of the projection 8i and bracket 6. Therefore, not only can sealing therebetween be realized, but fixing and holding also can be further secured.

On the bracket 6, formed is the ring-shaped first concave portion 6e in which the projection 8i of the brush holder 7 is inserted. On the bracket-side elastic member 16, formed is the outer radial-side piece portion 16a that interposed between the front end face of the projection 8i and groove bottom of the first concave portion 6e. The inner radial-side piece portion 16b that has a predetermined length in the radial direction is also formed on the bracket-side elastic member 16. The outer radial-side piece portion 16a is interposed between the ring-shaped abutting surface 8k that is formed at the inner radial side of the part of formation of the projection 8i of the brush holder 7 and inner radial side disk surface 6h of the part of formation of the first concave portion 6e. Accordingly, further fixing and holding are conducted at the inner radial-side part of the projection 8i, and further strong holding of the brush holder 7 is realized.

The outer radial-side piece portion 16a and inner radial-side piece portion 16b can be coupled therebetween by the coupling piece portion 16c, and they are all incorporated as one elastic member between the brush holder 7 and bracket. Accordingly fitting ability can be improved. For the bracket-side elastic member 16, too, the outer radial-side piece portion 16a and inner radial-side piece portion 16b can be coupled therebetween by the coupling piece portion 16c and incorporated as one elastic member between the brush holder 7 and bracket, so fitting ability can be improved.

The bracket-side elastic member 16 is one member as such, and the coupling piece portion 16c that is to couple the respective piece portions 16a and 16b is formed to be thin. Thus, even when the outer radial-side piece portion 16a has a large elastic deformation sufficient enough to display a sealing function, the coupling piece portion 16c absorbs the deformation so that an inconvenience such as transmission to the inner radial-side piece portion 16b can be avoided. It becomes possible to make the outer radial-side piece portion 16a and inner radial-side piece portion 16b sufficiently perform their individual functions without impairing the functions with respect to each other. And thereby, the occurrence of such an inconvenience as to make the sealing function by the outer radial-side piece portion 16a inferior can be prevented.

In this manner, by interposing the bracket-side elastic member 16, which is one member, the brush holder 7 and bracket 6 can be fixed and supported with a secure seal therebetween. On the brush holder 7, formed is the second guide piece 8h that is protruded to the bracket 6 as being located at the inner radial side further than the abutting surface with the bracket-side elastic member 16. On the bracket 6, formed is the second concave portion (guide concave portion) 6f in which the guide piece 8h inserted. Accordingly, positioning in the radial direction for incorporation of the brush holder 7 and bracket 6 can also be easily performed.

In the present embodiment constructed as such, the yoke-side elastic member 10 enhances the sealing ability between the yoke 2 and bracket 6. The brush holder 7 can be reliably fixed and held on the yoke without using a screw, for example, or other similar structure. The bracket-side elastic member 16 that is disposed on the bracket 6 side and the yoke-side elastic member 10 that is disposed on the yoke 2 side are not only different in shape from each other but also different in outside diameter. The radial position where the yoke 2 presses the brush holder 7 and the position where the bracket 6 presses the brush holder 7 are provided in a manner displaced in the radial direction. Therefore, it becomes unnecessary to require a special shape to fix and hold the brush holder 7 in a sandwiched manner in the yoke 2 and bracket 6. This does not only improves the degree of design freedom but also makes it possible to realize downsizing.

The present disclosure is useful for a holding structure of a brush holder for an electric motor that is a component of electric equipment to be mounted on a vehicle. Because it is unnecessary to form a concave portion to fit a convex portion on the outer circumference of a yoke or housing, it is possible to form a brush holder that is small in the outside diameter of the yoke or housing. This leads to a reduction in weight and size. Furthermore, since it is unnecessary to externally fit and attach tubular elastic members to convex portions formed in the circumferential direction, productivity can be further enhanced.

What is claimed is:
1. An electric motor, comprising:
a motor shaft;
a cylindrical yoke with a bottom that supports a base end portion of the motor shaft;
a bracket that covers an opening of the yoke; and
a brush holder that is positioned at a side of the yoke in an axial direction of the motor shaft of the bracket, the brush holder comprising:

a first disk portion that is formed with a brush housing portion that has three side piece portions without a bottom piece portion that opposes with respect to the bracket; and a second disk portion with the bottom piece portion, the second disk portion being positioned at a side of the bracket in the axial direction of the motor shaft of the first disk portion wherein:

the first disk portion and the second disk portion are integrated with each other, a ring-shaped abutting surface that includes an opposing surface of the bottom piece portion of the second disk portion with respect to the bracket is formed on a disk surface at an opposing side with respect to the bracket in the axial direction of the motor shaft of the brush holder, and the abutting surface is formed as a holding portion that is pressed to the yoke by the bracket via an elastic member that is disposed to a surface at an opposing side with respect to the brush holder in the axial direction of the motor shaft of the bracket, the elastic member being located within the bracket.

2. The electric motor according to claim 1, wherein the bracket-side elastic member is formed in a flat ring shape.

3. The electric motor according to claim 2, wherein a rib is provided on the bracket-side elastic member in a protruding condition so as to make contact with the abutting surface.

4. The electric motor according to claim 1, wherein:

a ring-shaped projection that protrudes to a bracket side is formed at an outer radial side of the abutting surface, a ring-shaped first concave portion, in which the projection is inserted, is formed on a brush holder-side side surface of the bracket, and the bracket-side elastic member comprising:

an inner radial-side piece portion that is interposed in the abutting surface;

an outer radial-side piece portion that is interposed between a front end face of the projection and a groove bottom of the first concave portion; and a coupling piece portion that couples the inner radial-side and outer radial-side piece portions and is interposed between an inner circumferential surface of the first concave portion and an inner circumferential surface of the projection.

5. The electric motor according to claim 1, wherein:

a guide piece is formed on the brush holder and protrudes to a bracket side so as to be located at an inner radial side of the abutting surface, and a ring-shaped first concave portion is formed on the bracket in which the guide piece is inserted.

6. The electric motor according to claim 1, wherein the brush holder and an end portion of the opening of the yoke hold a flat-plate ring-shaped yoke-side elastic member in an interposing manner.

7. The electric motor according to claim 1, wherein the bracket-side elastic member is constructed with an outside diameter smaller than that of a yoke-side elastic member.

8. A brush holder, comprising:

a first disk portion that is formed with a brush housing portion that has three side piece portions without a bottom piece portion; and a second disk portion with the bottom piece portion, wherein:

the first disk portion and the second disk portion are integrated with each other, a ring-shaped abutting surface that includes an opposing surface of the bottom piece portion of the second disk portion is formed on a disk surface, and the abutting surface is formed as a holding portion for an elastic member, the elastic member being located within the first disk portion.

9. The brush holder according to claim 8, wherein the elastic member is formed in a flat ring shape.

10. The brush holder according to claim 9, wherein a rib is provided on the elastic member in a protruding condition so as to make contact with the abutting surface.

11. The brush holder according to claim 8, wherein:

a ring-shaped projection is formed at an outer radial side of the abutting surface, and the elastic member includes an inner radial-side piece portion that is interposed in the abutting surface.

12. The brush holder according to claim 8, further comprising a guide piece that protrudes so as to be located at an inner radial side of the abutting surface.

13. An electric motor comprising the brush holder according to claim 8.

* * * * *